June 17, 1958 E. B. YOUNG 2,838,868
HAT ATTACHMENT
Filed May 4, 1956
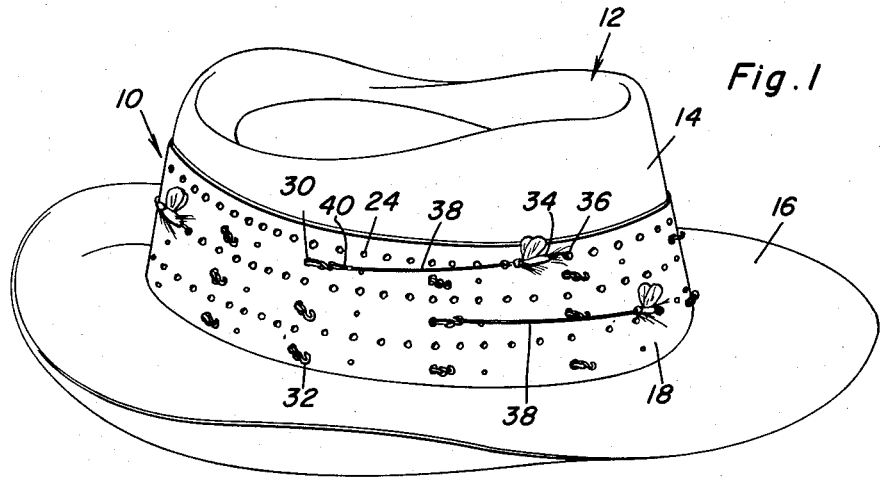
Fig. 1
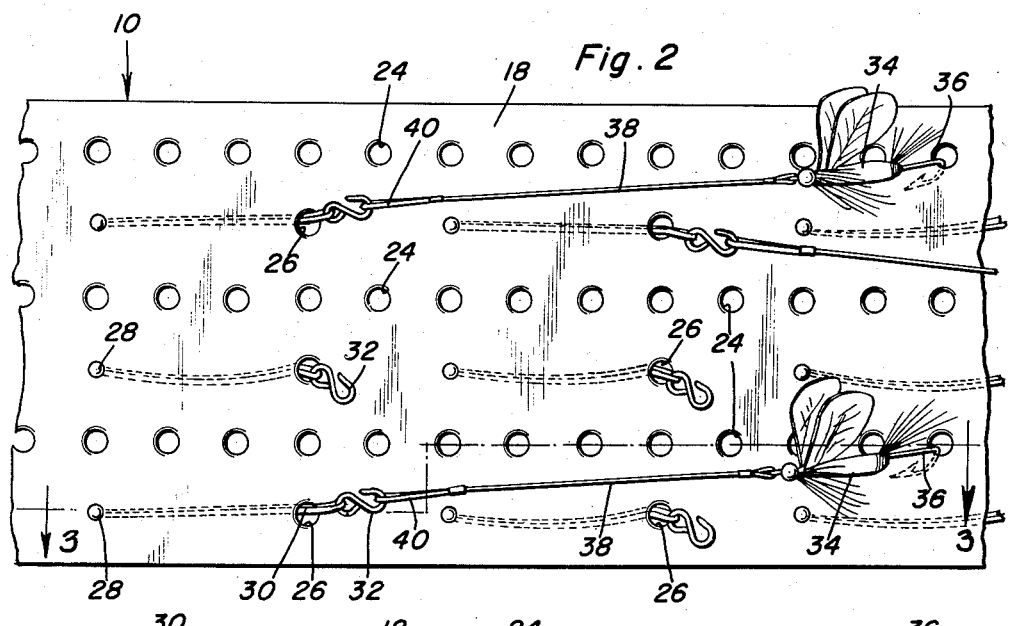
Fig. 2
Fig. 3
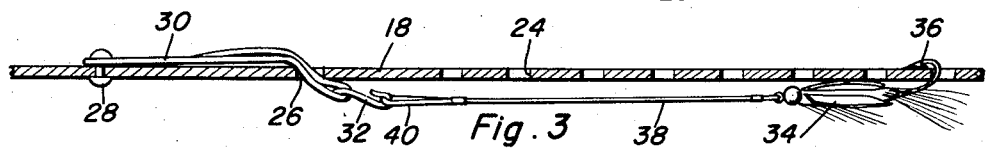
Fig. 4
Eugene B. Young
INVENTOR.

United States Patent Office 2,838,868
Patented June 17, 1958

2,838,868

HAT ATTACHMENT

Eugene B. Young, Delta, Colo.

Application May 4, 1956, Serial No. 582,861

2 Claims. (Cl. 43—57.5)

This invention generally relates to an attachment for an article of wearing apparel and more particularly relates to an attachment for a hat worn by a fisherman for supporting and carrying fish hooks, flies, leaders and other similar fishing devices.

In fishing, the problem arises in carrying or supporting the various types of hooks, flies or lures and the like wherein it is desirable to carry a considerabl supply of these articles and it is desirable that these devices be available for immediate use, as when a fisherman is wading in a stream. In order to support the fishing devices in the desired position, there has become prevalent the practice of supporting the hooks and various similar devices on the usual hatband of a hat. However, this is highly unsatisfactory since it is frequently hard to dislodge the barbed hook and also the hooks sometimes become accidentally dislodged and become lost. Accordingly, it is the primary object of the present invention to provide an attachment in the form of a hat band which is employed for supporting fishing devices such as fish hooks, flies, lures, any of which may have leaders attached thereto with a loop in one end thereof.

Another object of the present invention is to provide an attachment in the form of a hatband which may be employed to support a plurality of fishing devices so that they will be held in unkinked and uncrossed condition for instant use, wherein the fishing devices will not become entangled with each other.

Other objects of the present invention will reside in its simplicity of construction, ease of attachment to existing hats or incorporation into new hats, adaptation for supporting various types of fishing devices and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a hat with the hatband of the present invention attached thereto;

Figure 2 is an enlarged plan view of a section of the flexible band illustrating the construction and relationship of the elements thereof;

Figure 3 is a detailed sectional view taken substantially along a plane passing along section line 3—3 of Figure 2 illustrating the manner of attaching the rubber bands to the flexible band and the fish lure to the flexible band; and Figure 4 is a detailed sectional view illustrating the manner for detachably engaging the hat band to the hat.

Referring now specifically to the official drawings, the numeral 10 generally designates the attachment in the form of a hatband of the present invention for attachment to a hat generally designated by the numeral 12 which includes a crown portion 14 and the brim 16 all of which represents a conventional structure wherein the hat 12 may be constructed of felt or any other similar material.

The attachment 10 generally includes an elongated band 18 of flexible material which is provided with a plurality of vertically spaced hooks 20 on one free end thereof for engagement with a plurality of vertically spaced apertures 22 in the other end thereof for securing the flexible band 18 on the crown portion 14 of the hat 12. It will be understood that a series of the apertures 22 may be provided in longitudinally spaced relation for adjustably mounting the band 18 on crown portion 14 of varying sizes.

Referring now specifically to Figure 2, it will be noted that the major portion of the hatband 18 is provided with a plurality of spaced apertures 24 which are arranged in vertically spaced circumferential rows. Disposed below each row of apertures 24 is a circumferential row of apertures 26 which are spaced relatively a long distance apart. Also disposed beneath each row of apertures 24 is a row of rivets 28 for securing one end of a rubber band 30 to the inner surface of the band 18 wherein the rivets 28 are in spaced relation to the apertures 26 so that the free end of the rubber band 30 will project therethrough and the free end of the rubber band 30 is provided with a hook 32 for retaining the free end of the rubber band through the aperture 26 substantially as illustrated in Figure 2.

A fish lure, fly or the like designated by the numeral 34 is provided with a barbed hook 36 on end thereof and a leader 38 on the other end thereof having a loop 40 for engagement with the hook 32 wherein the barbed hook 36 on the fly 34 may be engaged with one of the apertures 24 with the rubber band 30 being tensioned substantially as illustrated in Figure 2 for securely retaining the leader 38 and fly 34 in position. Due to the staggered relationship of the apertures 26 and 24, the leaders 38 and flies or lures 34 will be retained in such a position that they will not become entangled with each other thereby facilitating the removal of the fishing devices.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for a hat having a crown comprising a band encircling said crown, a plurality of apertures in said band, a plurality of endless rubber bands having a portion thereof secured to the undersurface of the band and extending through said apertures, the portion of each rubber band extending through the apertures having fastening means thereon for attachment to a fish hook whereby the fish hook may be engaged with another aperture with the rubber band tensioned thereby resiliently retaining the fish hook in supported position, said apertures being arranged in circumferential rows with apertures receiving the rubber bands being disposed below the apertures receiving the barb end of the fish hook.

2. An attachment for the crown of a hat comprising an elongated flexible band encircling the crown of the hat, means detachably connecting the ends of the band together for removably retaining the band in crown encircling position, said band having a plurality of laterally spaced longitudinal rows of apertures, a plurality of elongated resilient members each having one end portion secured to the undersurface of the band and an intermediate portion extending through an aperture in one row of apertures, means on the other end of each of said resilient members for preventing withdrawal thereof through the aperture and for attachment to the loop end of fish hook means whereby the hook end of the fish hook means may be engaged with an aperture in another row of apertures with the resilient member tensioned thereby resiliently retaining the fish hook means supported on the band.

References Cited in the file of this patent

UNITED STATES PATENTS

| | | |
|---|---|---|
| 197,935 | Holt | Dec. 11, 1877 |
| 549,970 | Lawrence | Nov. 19, 1895 |
| 1,133,542 | Deal | Mar. 30, 1915 |
| 2,493,344 | Hamel | Jan. 3, 1950 |